United States Patent
Dörenberg

(10) Patent No.: US 10,494,195 B2
(45) Date of Patent: Dec. 3, 2019

(54) BUFFER TABLE, METHOD FOR OPERATING A BUFFER TABLE AND PACKAGING SYSTEM WITH A BUFFER TABLE

(71) Applicant: SIG Technology AG, Neuhausen am Rheinfall (CH)

(72) Inventor: Udo Dörenberg, Kerpen (DE)

(73) Assignee: SIG Technology AG, Neuhausen am Rheinfall (CH)

( * ) Notice: Subject to any disclaimer, the term of this patent is extended or adjusted under 35 U.S.C. 154(b) by 99 days.

(21) Appl. No.: 15/761,538

(22) PCT Filed: Jun. 14, 2016

(86) PCT No.: PCT/EP2016/063555
§ 371 (c)(1),
(2) Date: Mar. 20, 2018

(87) PCT Pub. No.: WO2017/054942
PCT Pub. Date: Apr. 6, 2017

(65) Prior Publication Data
US 2018/0346260 A1    Dec. 6, 2018

(30) Foreign Application Priority Data
Sep. 29, 2015 (DE) .......... 10 2015 116 472

(51) Int. Cl.
*B65G 47/51* (2006.01)
*B65B 35/24* (2006.01)
(Continued)

(52) U.S. Cl.
CPC .......... *B65G 47/5104* (2013.01); *B65B 35/24* (2013.01); *B65B 61/205* (2013.01);
(Continued)

(58) Field of Classification Search
CPC .............. B65G 47/684; B65G 47/5145; B65G 47/5113; B65G 47/5109; B65G 47/51;
(Continued)

(56) References Cited

U.S. PATENT DOCUMENTS

| 1,905,025 | A | * | 4/1933 | Allen | ................. | B65G 47/5145 |
| | | | | | | 198/579 |
| 4,917,228 | A | * | 4/1990 | Ichihashi | ................ | B05B 12/14 |
| | | | | | | 104/88.03 |

(Continued)

FOREIGN PATENT DOCUMENTS

| DE | 10312695 A1 | 10/2004 |
| DE | 102005061309 A1 | 7/2007 |

(Continued)

*Primary Examiner* — James R Bidwell
(74) *Attorney, Agent, or Firm* — The Webb Law Firm

(57) ABSTRACT

A buffer table of a packaging system includes, at least two infeeds, at least two outfeeds, and a plurality of buffer lines supplied separately from each other, arranged between the infeed and the outfeed. Optimised use of the buffer table is achieved by the infeed supplying the respective package to one of the buffer lines depending on the level of completion of a package and by the outfeed removing the respective package from the respective buffer lines depending on the level of completion of the package.

26 Claims, 11 Drawing Sheets

(51) Int. Cl.
*B65B 61/20* (2006.01)
*B65G 47/46* (2006.01)
*B65B 65/00* (2006.01)

(52) U.S. Cl.
CPC ............ *B65B 65/003* (2013.01); *B65G 47/46* (2013.01); *B65G 47/5145* (2013.01)

(58) Field of Classification Search
CPC ......... B65G 47/46; B65B 35/24; B65B 61/20; B65B 65/00
USPC ..................................................... 198/347.4
See application file for complete search history.

(56) References Cited

U.S. PATENT DOCUMENTS

| | | | | |
|---|---|---|---|---|
| 5,630,309 | A * | 5/1997 | Blidung | ................ B65B 43/126 198/347.4 |
| 2002/0117429 | A1 | 8/2002 | Takizawa | |
| 2016/0052726 | A1* | 2/2016 | Steeber | .............. B65G 47/5127 198/347.4 |
| 2016/0130093 | A1* | 5/2016 | Hanselman | ............ B65G 17/44 198/347.1 |
| 2019/0039097 | A1* | 2/2019 | Carpenter | ............ B65G 1/1378 |

FOREIGN PATENT DOCUMENTS

| | | |
|---|---|---|
| DE | 102012220479 A1 | 5/2014 |
| EP | 0373060 A1 | 6/1990 |
| FR | 2988709 A1 | 10/2013 |
| JP | 7267351 A | 10/1995 |
| WO | 2014087257 A1 | 6/2014 |

\* cited by examiner

BUFFER TABLE, METHOD FOR OPERATING A BUFFER TABLE AND PACKAGING SYSTEM WITH A BUFFER TABLE

CROSS-REFERENCE TO RELATED APPLICATIONS

This application is the United States national phase of International Application No. PCT/EP2016/063555 filed Jun. 14, 2016, and claims priority to German Patent Application No. 10 2015 116 472.8 filed Sep. 29, 2015, the disclosures of which are hereby incorporated in their entirety by reference.

BACKGROUND OF THE INVENTION

Field of the Invention

The subject matter relates to a buffer table of a packaging system, a packaging system with such a buffer table and a method for operating a buffer table.

Description of Related Art

Packaging systems are today characterised by a plurality of packaging stations (packaging devices) which further process the packages in respectively different working steps. Thus for example in the case of filling systems following a filling machine, initially for example a straw applicator and then a shrink film applicator are used. A plurality of packages are combined to form a container in the shrink film applicator. The mentioned devices are of course purely exemplary, however they are fully covered by the subject matter.

The processing rate (number of packages/unit of time) is always paramount in the context of the normal development of a packaging system. The higher the processing rate, the more efficient the system is. This means that it is always the aim to increase the processing rate of each individual device and thus the entire packaging system. In the case of operating a packaging system, the aim is to operate the respectively slowest packaging device as far as possible at its maximum processing rate so that the throughput of packages of a packaging system is maximised as far as possible.

Since disruptions may also occur in individual packaging devices in the context of the processing of the packages, provision has hitherto been made for a buffer table to be able to be arranged between two packaging devices. This buffer table receives packages when a fault occurs downstream of the packaging system and the packages can no longer continue to be processed downstream. As soon as the downstream fault is resolved, the packages can be retrieved from the buffer table and further processed.

By way of the buffer table it is possible to continue to operate the upstream devices for a certain time, at least until the buffer table is full.

The use of the buffer table thus increases the reliability of an upstream device in the case of a failure of a downstream device, since the upstream device can still always initially fill the buffer table with packages, well before it has to be shut down. If the fault has been before that resolved, the upstream device can continue its operation without interruption.

A buffer table is, however, always a cost factor for a packaging system. In addition, the buffer table occupies valuable space which must be made available at the production site. It is not always possible to arrange all optionally necessary buffer tables on the available production area such that hitherto compromises have always had to be made regarding between which devices a buffer table was arranged and where a buffer table could be dispensed with.

For this reason, an object underlying the subject matter was to provide a novel buffer table which has a low space requirement with respect to conventional buffer tables in the case of simultaneous operation of a plurality of packaging devices.

SUMMARY OF THE INVENTION

This object is achieved by a buffer table, a packaging system and a method according to the present invention.

It has been recognized that a buffer table can receive not only packages at a single level of completion, but rather also at levels of completion different to each other. By receiving packages at levels of completion different to each other, it is possible to receive the packages from different packaging devices using only one buffer table. It is thus possible with the aid of the buffer table according to the subject matter to respectively provide a buffer option for packages downstream of at least two packaging devices. This is achieved without an additional space requirement since a single buffer table can receive packages of different levels of completion.

To this end, a buffer table according to the subject matter comprises at least two infeeds. The packages from different packaging devices are supplied to the buffer table at the infeed.

The buffer table according to the subject matter also has at least two outfeeds. The packages are removed from the buffer table at the outfeed. Each of the outfeeds is capable of outfeeding packages from the buffer table and supplying them to a downstream packaging device. Both the infeed and also the outfeed can respectively process packages at a different level of completion.

Packages are supplied from a first packaging device (wherein packaging device should also be understood as a filling machine) to a first infeed and from a second packaging device to a second infeed separated therefrom. The packages are supplied from a first outfeed to at least one second packaging device and the packages are supplied from a second outfeed different from the first outfeed to a third further downstream packaging device.

The buffer table thus provides two packaging devices different from each other the possibility of storing packages on the buffer table.

In order to avoid packages being interchanged on the buffer table, it is also proposed to provide a plurality of buffer lines which can be loaded separately from each other, arranged between the infeed and the outfeed. The buffer lines are preferably regions inside a buffer table which respectively receive packages. Packages are received on a buffer line at one time, preferably at only one level of completion, according to the subject matter.

However, packages of different levels of completion can thus be simultaneously stored on a buffer table, wherein these can then, however, be stored in two buffer lines different from each other.

In order to enable this, it is proposed for the infeed to supply the respective package to one of the buffer lines depending on the level of completion of a package and for the outfeed to remove the respective package from the respective line depending on the level of completion of the package.

Preferably one infeed is respectively assigned to a packaging device or to a package with one level of completion. Preferably one outfeed is also respectively assigned to a downstream packaging device or to a package with a determined level of completion.

A package initially reaches the buffer table at a first level of completion along the flow direction of the packages through the packaging system and is supplied to the buffer table via a first infeed. This package is then removed from the buffer table via a first outfeed and supplied to at least one second packaging device. The package is supplied to the buffer table at a second level of completion via the second infeed at the outlet of the at least one second packaging device and this package is removed at the second level of completion from the buffer table at the second outfeed.

A buffer table can, in this regard, transfer the packages without delay, if all packaging devices downstream work properly, by the packages being transported via a determined buffer line initially without delay from the infeed to the outfeed. These determined buffer lines can also be understood as bypass buffer lines which, as a rule, respectively transport the packages only from the infeed to the outfeed. Preferably the determined buffer lines are respectively assigned precisely to one of the infeeds and to one of the outfeeds.

If a downstream fault occurs, the outfeed provided before, preferably directly before the fault or before, preferably directly before the faulty packaging device is instructed not to remove any further packages from the buffer table. The first buffer line of the buffer table, preferably assigned exclusively to the outfeed is initially filled as a result until it has reached a maximum fill level.

The buffer table is then successively filled by the infeed assigned to this outfeed along further buffer lines. This is either carried out until the buffer table as a whole has a maximum fill level or the fault has been resolved and the buffer table can then be emptied. If the fault in the downstream packaging device has not been resolved by the time the maximum fill level is reached, at least the directly upstream packaging device, therefore however consequently the entire packaging system is also stopped. In particular, all packaging devices directly assigned to the respective buffer table are stopped, that is to say, all the packaging devices which directly supply packages to the infeeds or receive them from the outfeeds.

If the fault is resolved downstream, the downstream packaging device starts its operation again. The buffer table can thereby be successively emptied again by the outfeed receiving the packages from the previously filled buffer lines and supplying them to the downstream packaging device until the buffer table is empty.

The supply and removal of packages to and from the buffer table takes place specifically with transport means. Such transport means are preferably arranged at each infeed and at each outfeed. This means that packages from the transport means reach the buffer table via the infeed and reach a transport means from the buffer table via the outfeed. With the aid of the transport means, continuous processing of packages is possible in packaging devices along the packaging system without manual intervention being necessary.

According to one embodiment, one infeed is respectively assigned to one outfeed, wherein the levels of completion of the package are respectively identical at the infeeds and outfeeds assigned to each other.

For linear transport of the packages along the buffer table, it is advantageous for respectively at least one outfeed and one infeed to be arranged at respectively one of two distal ends of the buffer lines. Thus the package can reach the buffer line via the infeed, be moved linearly along the buffer line and removed once again from the buffer line at the outfeed. A reversal of the transport direction on the buffer line is thus not required for the respective package.

A particularly simple arrangement of the packaging devices around the buffer table is then possible when a first infeed is arranged at a first end of the buffer table, a first outfeed is arranged at an end of the buffer table opposite this end, which first outfeed is assigned to the first infeed and also a second infeed. The second outfeed, which is assigned to the second infeed, can then be provided at the end of the buffer table at which the first infeed is arranged. The package thus runs at a first level of completion from the first infeed along a first transport direction to the first outfeed. From there, the package runs via at least one further packaging device and obtains a further level of completion. The package then runs via the second infeed on the buffer table. The package is then transported in an opposing direction to the first transport direction, which the package had previously taken on the buffer table, and is moved to the second outfeed.

According to one embodiment, it is proposed that the levels of completion at at least two of the infeeds are different from each other. As already explained, the buffer table is intended as a buffer means for at least two packaging devices. This means that the buffer table can receive packages from the first packaging device and from the second packaging device in which the packages of the first packaging device are further processed. In this respect, the levels of completion can then be different at the respective infeeds.

In order to transport the respective packages, respective transport means are provided along the respective buffer lines. The transport means are equipped to receive the packages at different levels of completion. To this end, the transport means of the respective buffer lines can be designed such that the packages can also be received in different container sizes or alignments. In particular, the line widths of the buffer lines can be variably designed.

It is also proposed for transport means to supply the packages at respectively different levels of completion to the respective infeed. Such transport means are connected to the buffer table and receive packages with one level of completion from a packaging device and then transport the same to the respective infeed. The transport means can respectively be adapted to the level of completion of a package between a packaging device and an infeed.

It is also proposed to respectively provide one transport means at the outlet side of a buffer table, thus at the outfeed. Such a transport means then receives packages at a determined level of completion. Transport means at different infeeds or different outfeeds can, however, be designed for packages with different levels of completion.

According to one embodiment, it is proposed for the infeeds to respectively comprise at least one supply means and/or for the supply means of the respective infeeds to be operated separately from each other.

The packages must be supplied from the infeed to a respective buffer line. The buffer lines are preferably arranged adjacent to each other on a buffer table. The infeed is connected to the transport means on which the packages are generally supplied in a linear movement to the buffer table. However, in order to then be able to distribute the supplied packages on the individual buffer lines, it is necessary to vary the movement direction of the packages, in particular from the transport means to the respective buffer line which is currently used. To this end, supply means are respectively provided. A supply means can be provided at each infeed, which transports the packages on the respective buffer line depending on the respectively other supply means. The supply means can be so-called satellites or deflectors which ensure that the packages supplied by the transport means are supplied to the respectively correct buffer line.

The supply means receive the packages at the infeed and deflect these such that they can be received in a buffer line. It is possible by way of the supply means to supply packages originating from a single transport means sequentially to different buffer lines.

In order to ensure that packages are respectively removed only at one single level of completion at one outfeed from a buffer line, in particular such that they are suitable for the subordinate packaging device downstream of the outfeed, it is proposed for the supply means to respectively supply only packages with the same level of completion respectively to a buffer line. A plurality of buffer lines are arranged adjacent to each other on the buffer table. The supply means are equipped such that packages are respectively supplied to a buffer line at only one level of completion respectively. It is thus ensured that when the buffer lines are emptied, all packages on the buffer line have the same level of completion and can be supplied to a correct packaging device at the outfeed.

According to one embodiment, it is proposed for the outfeeds to respectively comprise at least one removal means. The removal means preferably function corresponding to the supply means such that reference is made to the explanation of the supply means respectively.

In order to be able to supply packages at different levels of completion from different buffer lines of the buffer table to different outfeeds, it is proposed for the removal means to be operated separately from each other. Each individual removal means can thus be individually assigned to a buffer line such that the packages stored on this buffer line can be exclusively supplied to a determined outfeed and to a determined transport means.

According to one embodiment, it is proposed for the removal means to transport the packages to the outfeed between one of the buffer lines and the respective transport means. If a buffer line is emptied, then the packages are continuously provided at the end of the buffer line. These packages are then transported via the removal means to the respective transport means and from there to the downstream packaging device.

Thus as the supply means supply the buffer lines with respectively only packages of the same level of completion, the removal means thus also remove only packages with the same level of completion from respectively one buffer line according to one embodiment.

According to one embodiment, it is proposed for the removal means and/or the supply means to be formed as linearly operated satellites which are moved transversely, preferably perpendicularly to the buffer lines and assign the packages respectively to one buffer line. Deflectors can also preferably be provided which are moved transverse to the buffer lines in order to deflect the packages proceeding from a transport means along the transport direction thereof such that they are moved to the correct buffer line.

Pivotably operated belts are also conceivable, wherein a distinction can be made between the buffer lines by pivoting, proceeding from the transport belt.

According to one embodiment, it is proposed for the buffer lines to comprise a transport means. With the aid of the transport means, the packages can be transported along a buffer line between the infeed and the outfeed or between the supply means and the removal means. The transport means comprise, in particular transport belts or transport rail or transport rolls or transport strips. The same of course applies to the transport means which are arranged on the inlet side of the infeed and on the outlet side of the outfeed and were previously described.

According to one embodiment, it is proposed for the buffer lines to be respectively supplied by at least two of the supply means, as required. The supply means can supply the same buffer lines. This is, however, only possible in temporal sequence. In this respect, one buffer line can be supplied at one time only by one supply means. The other supply means cannot supply this buffer line until the buffer line has been completely emptied by the removal means. It is thus proposed for a buffer line to initially receive packages in temporal sequence at a first level of completion from a first supply means and subsequently receive packages at a second level of completion, different to the first, from a second supply means. In this regard, it is proposed for the buffer line to be initially completely emptied after it has been supplied with packages at a first level of completion by a first supply means, before this buffer line is then supplied with packages at a second level of completion by a second supply means.

According to one embodiment, it is proposed for at east two of the buffer lines to be respectively supplied by at least two of the supply means simultaneously. This means that two buffer lines different to each other can be simultaneously supplied at one time by two supply means at the same time.

The level of completion is, in particular different in the case of simultaneous supply depending on the supply means such that the buffer table can receive packages of different levels of completion simultaneously in different buffer lines.

According to one embodiment, a plurality of buffer lines arranged adjacent to each other are provided on the buffer table. The more buffer lines have been arranged adjacent to each other, the greater the buffer capacity of the buffer table is and the probability of failure of the packaging system is reduced.

According to one embodiment, it is proposed for at least two supply means to be arranged at the buffer lines and for the supply means to be respectively assigned exclusively to one of two, preferably distal, buffer lines.

Each supply means preferably has a buffer line assigned exclusively to it. The packages initially run via this exclusively assigned buffer line from the infeed to the outfeed without interruption. During fault-free operation, packages of different packaging levels thus respectively run via the buffer table via two buffer lines from a respective infeed to a respective outfeed. The buffer lines exclusively assigned respectively to one of the supply means or to one of the infeeds or to one of the removal means or to one of the outfeeds are preferably provided at the outer ends of the buffer table.

If there is a fault, the outfeed is interrupted upstream of the faulty packaging device. The buffer table is filled proceeding from this outfeed. As soon as a buffer line is filled, the next buffer line is filled. It can be variably designed as to which is the next buffer line that is filled. It is, in particular possible to respectively supply an adjacent buffer line proceeding from the buffer line exclusively assigned to the supply means. It may also be expedient to alternately supply the following buffer lines proceeding from the buffer line exclusively assigned to the supply means. In this regard, alternately may mean that respectively one buffer line remains unsupplied between at least two buffer lines to be supplied. More than one buffer line may also remain unsupplied between two supplied buffer lines. The supply thus initially takes place alternating from buffer line to buffer line until an end of the buffer table is reached or a determined limit on the buffer table up to which the respective supply means can supply. The buffer lines skipped in this regard are then supplied in reverse sequence until the buffer table is completely filled.

The limit up to which the supply means can supply, can be set, e.g. up to the half of all buffer lines, or it can be variable. The limit can e.g. be dynamically calculated from the previous probabilities of fault of the downstream packaging devices. The limit can e.g. be calculated from the ratio of the probability of fault of the packaging devices between first outfeed and second infeed to the probability of fault of the packaging devices at the second outfeed.

It can be determined, according to a preferred embodiment, by reaching a defined fill level when the supply of a buffer line has ended and a subsequent buffer line is supplied. When a buffer line has reached a determined fill level, the supply means moves to a subsequent buffer line which is preferably adjacent or alternating at east the next but one buffer line.

The buffer able can be both a vertical and a horizontal buffer table.

In the case of filling the buffer table, it is necessary for the buffer table to also be able to be emptied again as soon as the downstream packaging devices work without fault. This is then preferably possible when the processing rate of a packaging device is greater downstream than the processing rate of a packaging device upstream. An increase of the processing rates of the packaging devices is thus preferred so that the buffer table can also be emptied again following at least partial filling without the upstream packaging device having to reduce its processing rate. It has been shown that at least a 20% higher processing rate of a packaging device than the processing rate of an upstream packaging device leads to a sufficiently fast emptying of the buffer table.

BRIEF DESCRIPTION OF THE DRAWINGS

Below, the subject matter is explained in more detail by means of drawings showing exemplary embodiments. In the drawings are shown.

DESCRIPTION OF THE INVENTION

Figure 1:
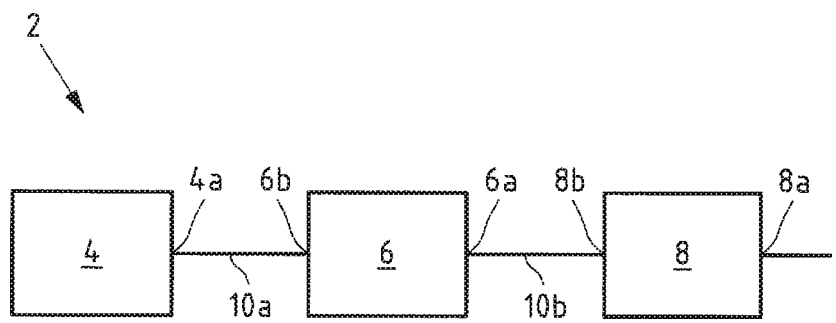
FIG. 1 a schematic view of a packaging system with packaging devices.

FIG. 1 shows a packaging system 2 with a filling machine 4 as the first packaging device, a buffer table 6 and a straw applicator 8 as the second packaging device. The filling machine 4 has an outfeed 4a. Packages, for example beverage cartons or the like, preferably in a closed state are provided from the outfeed 4a on a transport belt 10a. The packages are supplied to an infeed 6b of the buffer table 6 via the transport belt 10a.

An outfeed 6a is provided on the outlet side of the buffer table 6 via which the packages stored temporarily on the buffer table 6 are fed out.

A second transport belt 10b is provided at the outfeed 6a which transport belt supplies the packages to the straw applicator 8. An infeed 8b is provided at the inlet side of the straw applicator 8. An outfeed 8a is provided on the outlet side of the straw applicator 8. The packages applied with the straw are output at the outfeed 8a from the straw applicator 8.

The packaging system 2 shown is purely exemplary and the sequence and arrangement of the filling machine 4, buffer table 6 and straw applicator 8 can be varied. However, a filling machine 4, a straw applicator 8, a shrink foil applicator or the like are to be understood objectively as a whole as packaging devices of a packaging system 2.

The buffer table 6 serves as temporary buffer of packages provided by the filling machine 4. The flow of packages is, viewed downstream, proceeding from the filling machine 4 via the transport belt 10a, the buffer table 6, the transport belt 10b to the straw applicator 8.

If a fault occurs downstream of the buffer table 6, in particular in the region of the straw applicator 8, the packages should no longer be supplied to the straw applicator 8. The buffer table 6 is provided in order to avoid the filling machine 4 having to be shut down. Packages can be fed in on the buffer table 6 via the infeed 6b, while no further packages are output at the outfeed 6a. This is possible until the buffer capacity of the buffer table 6 is reached. During this time, however, the filling machine 4 can continue to output packages. The time provided by the buffer table 6 can be used to resolve the problem at the straw applicator 8. As soon as the straw applicator 8 is functional again, packages can be supplied again via the outfeed 6a and the transport belt 10b to the straw applicator 8.

Figure 2:
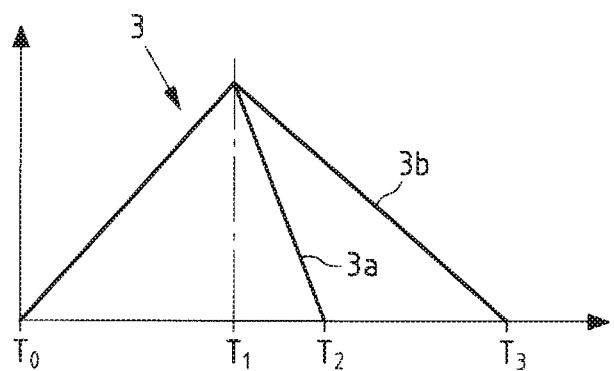
FIG. 2 a schematic course of a fill level of a buffer table.

The filling or the fill level of the buffer table 6 in the case of a fault downstream of the buffer table is plotted in FIG. 2. FIG. 2 shows the course 3 of the fill level of a buffer table 6 over time. At a time T0, a fault occurs downstream of the buffer table 6. The packages run via the infeed 6b from the filling machine 4, as before, into the buffer table 6 and the fill level thereof is increased up until a time T1.

At the time T1, the fault at the straw applicator 8 is resolved and the buffer table 6 can again output packages via the outfeed 6a.

In order to then reduce the fill level of the buffer table 6, while packages continue to simultaneously be fed in at an unchanged rate via the infeed 6b, it is necessary for the processing rate to be higher downstream of the buffer table 6 than the processing rate upstream of the buffer table. Otherwise, the buffer table 6 could not run empty.

Two different courses 3a, 3b of the fill state of the buffer table 6 are recorded in FIG. 2 in the case of different processing rates downstream of the buffer table 6. In the case of a processing rate of the straw applicator 8 that is only slightly higher than that of the filling machine 4, the fill state runs corresponding to the curve 3b and it lasts up to the time T3, until the buffer table 6 runs empty.

The higher the processing rate of the downstream processing device, the shorter the time is until the buffer table 6 runs empty. This is depicted by the curve 3b in FIG. 2 which shows the fill state progress in the case of a processing rate of the downstream packaging device increased with respect to curve 3a. The buffer table 6 is then already running empty at time T3. The two courses 3a, 3b of the fill level of the buffer table 6 show that the time until the buffer table 6 is running empty is variable and dependent on the processing rates of the packaging device 8 downstream of the buffer table 6.

It has also been recognised that a buffer table 6 is generally, that is to say in fault-free operation, not used. It was also recognised that the investment costs for a buffer table 6 are significant and in addition, a buffer table 6 has a significant space requirement. In order to increase the use of a buffer table 6, a dual use of the buffer table 6 is now objectively proposed, as schematically depicted in FIG. 3.

Figure 3:
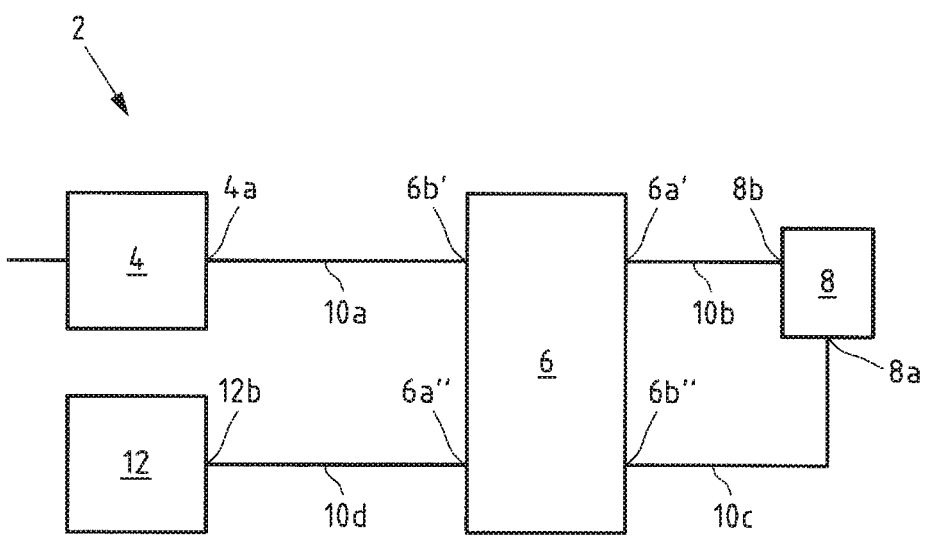
FIG. 3 a schematic view of an objective packaging system with an objective buffer table.

FIG. 3 shows a packaging system 2 according to one exemplary embodiment. The filling machine 4, the buffer table 6, the straw applicator 8 as well as a further packaging device 12 can be recognised in FIG. 3. All three are only representatively denoted as packaging devices below since the type of the packaging devices is not specifically relevant.

The buffer table 6 has a first infeed 6b' as well as a second infeed 6b". The buffer table 6 also has a first outfeed 6a' and a second outfeed 6a". A transport belt 10a runs from the first packaging device 4 to the first infeed 6b'. A transport belt 10b runs from the first outfeed 6a' to the packaging device 8 via an infeed 8b. A third transport belt 10c runs from an outfeed 8a to the second infeed 6b" and a transport belt 10d runs from the second outfeed 6a' ' to an infeed 12b of the packaging device 12.

Figure 4A:
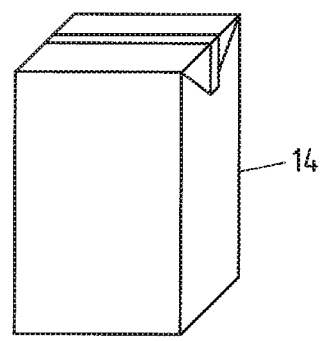
FIG. 4a a package at a first level of completion.

The packages 14 have a first level of completion at the outfeed 4a of the packaging device 4. This first level of completion is depicted in an exemplary manner in FIG. 4a. FIG. 4a shows a package 14 for liquid foodstuffs, for example a beverage package in the closed state which is output from the packaging device 4.

Figure 4B:
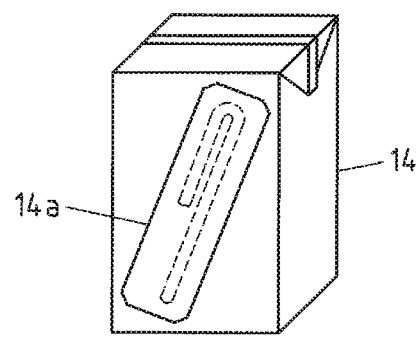
FIG. 4b a package at a second level of completion.

This package 14 now runs downstream as depicted in FIG. 3, via the transport belt 10a, the infeed 6b', the outfeed 6a' and the transport belt 10b to the packaging device 8. The level of completion of the package 14 is changed in the packaging device 8, for example by applying a straw. This package 14 further processed in this manner is output by the packaging device 8 at the outfeed 8a and, for example has the shape depicted in FIG. 4b. It can be recognised that by applying the straw 14a to the package 14, the level of completion is changed.

The package 14 further processed in this manner is supplied via the transport belt 10c to the second infeed 6b" and guided via the buffer table 6 to the second outfeed 6a". From there, the package 14 is transported further downstream via the transport belt 10d to the packaging device 12 or the infeed thereof 12b.

It has now been recognised that the buffer table 6 can be used more efficiently by the two infeeds 6b', 6b" and the outfeeds 6a' or 6a" respectively assigned to these. In the case of a downstream fault at the outfeed 6a', for example when at least one packaging device 8 arranged between the first outfeed 6a' and the second infeed 6b' operates with faults, the outfeeding of the packages 14 can be interrupted at the first outfeed 6a'.

Packages 14 run via the infeed 6b' on the buffer table 6 and are distributed there successively on buffer lines 16. This means that packages 14 are supplied via the infeed 6b' respectively to a buffer line 16, until it is full. So long as the fault in the packaging device 8 has not been resolved and the outfeed 6a' remains blocked, the packages are subsequently distributed on further buffer lines 16 until the buffer table 6 is filled or a defined fill level is reached.

As soon as the fault in the buffer device 8 is resolved, the packages 14 are once again fed out via the outfeed 6a' from the buffer table 6 and the buffer table 6 is emptied. As a result, it is thus possible for the processing rate of the packaging devices 8 arranged between the outfeed 6a' and the infeed 6b" to be higher than that of the packaging device 4. Fewer packages 14 thus run on the buffer table 6 than can be received by the packaging device 8 such that the buffer table 6 can be emptied little by little.

This also works for a downstream fault at the outfeed 6a". This may, for example then be necessary if the packaging device 12 operates with faults. Packages 14 are no longer fed out at the outfeed 6a" and the buffer table 6 is extensively filled by the infeed 6b".

Figure 5:
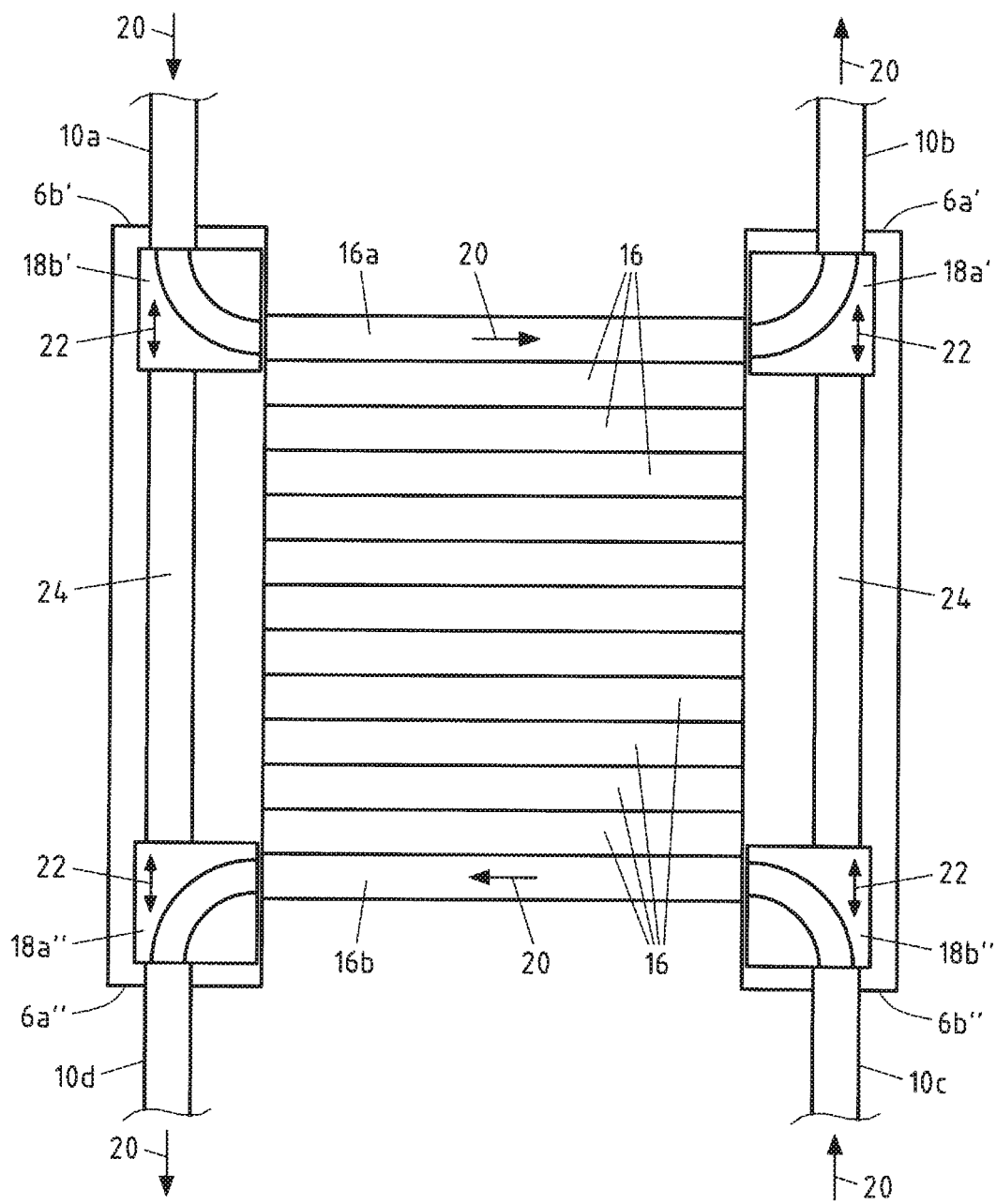
FIG. 5 a buffer table according to an exemplary embodiment.

A buffer table 6 in the sense of the subject matter is, for example depicted in FIG. 5. FIG. 5 shows a buffer table 6 with a plurality of buffer lines 16, wherein the buffer lines 16a, 16b respectively distal at the ends of the buffer table 6 are provided with reference numerals.

A first satellite 18b' is arranged at the infeed 6b'. A further satellite 18a' is arranged at the outfeed 6a'. A further satellite 18b" is arranged at the infeed 6b" and a satellite 18b" is arranged at the outfeed 6a".

It can be recognised in FIG. 5 that an infeed 6b' or 6b" as well as an outfeed 6a' or 6a" is respectively arranged at each side of the buffer table 6. This means that both an infeed and an outfeed can be provided on each side of a buffer table 6. As indicated below in FIG. 11, it is also possible for respectively two infeeds or two outfeeds to be provided at each side of a buffer table 6.

The flow direction of the packages 14 along the buffer table 16 is indicated by arrows 20 in FIG. 5. The packages 14 flow from the transport belt 10a via the satellites 18b' and the buffer line 16a to the satellites 18a' and the transport belt 10b in the flow direction. Following processing of the package 14 into a further level of completion, the packages 14 reach the buffer line 16b downstream via the transport belt 10c and the satellites 18h". From there, the packages enter the transport belt 10d via the satellites 18b".

Transport belts 24 are respectively provided at the buffer lines 16, by means of which the packages can be optionally moved in the direction of one side or another of the buffer table 6 along the buffer lines 16. It is hereby possible to move the packages 14 between the satellites 18b' and 18a' or the satellites 18b" and 18a". The satellites 18 are, in this regard, moved linearly along the directions 22.

The width of the buffer lines 16 is variable, in particular when the package widths change in the different levels of completion of the packages 14 or a bundle of a plurality of packages 14 is created from one package 14 in a completion step which bundle should then be temporarily stored on the buffer table 6.

The satellites 18 are moved linearly along the direction 22. This means that the satellites 18 can be moved by means of a linear movement of buffer line 16 to buffer line 16.

The transport belt 24 is also respectively provided between the satellites 18b', 18a'' or 18a' or 18b'' via which the packages 14 can be optionally moved into one or the other direction 22.

The satellites 18 are movable independently of each other such that each individual satellite 18 can respectively control a buffer line 16 depending on the position of a different satellite 18.

Figure 6:
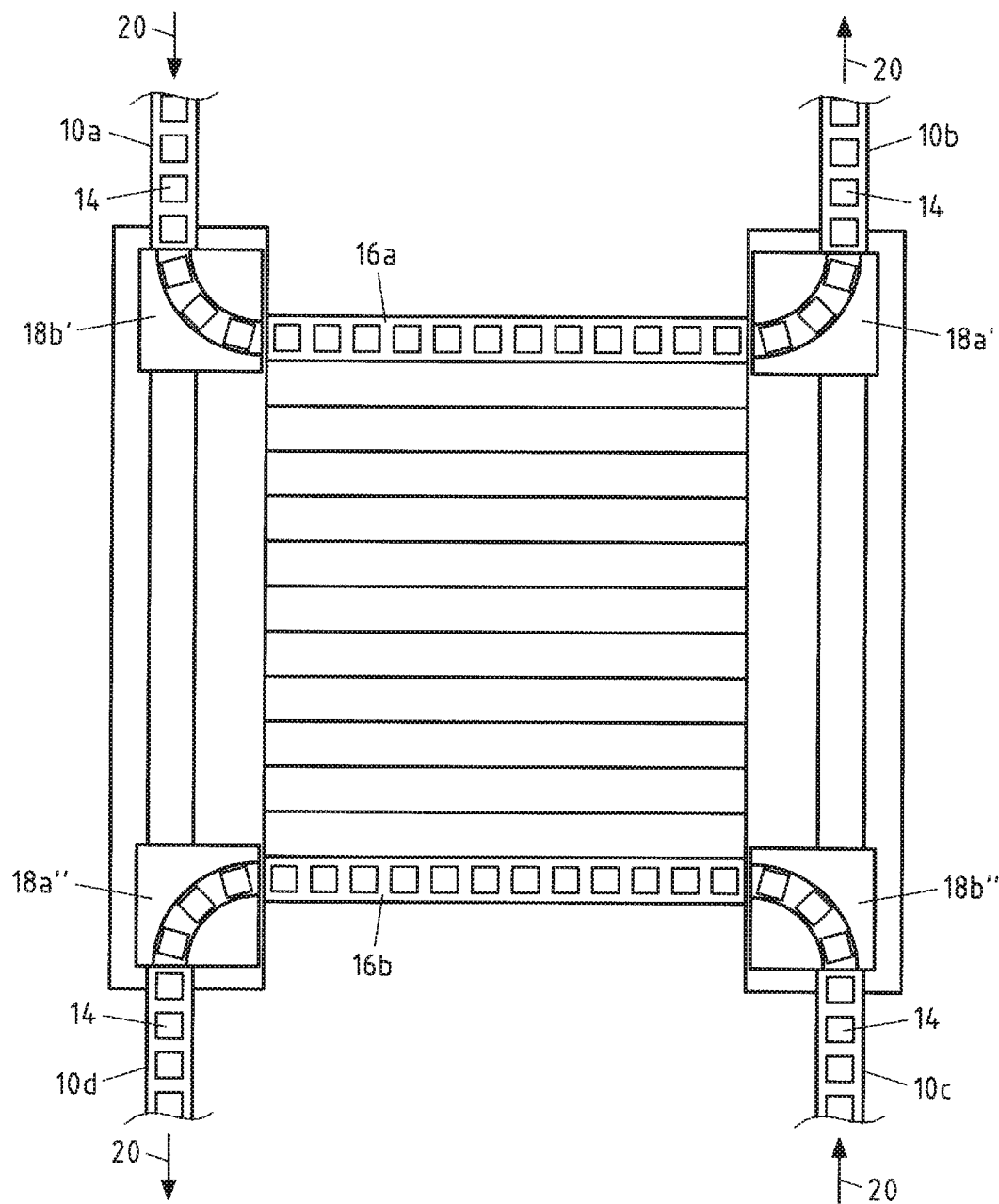
FIG. 6 a buffer table according to FIG. 5 in operation.

The function of the buffer table 6 according to FIG. 5 is depicted in normal operation in FIG. 6. Packages 14 run via the transport belt 10a into the satellites 18b' and are deflected there to the buffer line 16a. The packages 14 are moved in the buffer line 16a via a transport belt in the direction of the satellites 18a'. The packages 14 are again received there, moved in a deflected manner on the transport belt 10b.

Further processed packages 14, at a different level of completion than on the transport belts 10a, 10b, reach the satellite 18b'' via the transport belt 10c. The satellite 18b'' deflects the packages 14 on the buffer line 16b. The transport belt arranged there transports the packages 14 to the satellite 18a'', which deflects the packages and provides them on the transport belt 10d.

In this state, the buffer lines 16a and 16b are respectively assigned to a pair made up of first infeed 18b' and first outfeed 18a' or second infeed 18b'' and second outfeed 18a''. This assignment can be exclusive such that packages 14 on the buffer line 16a can only be provided by the satellite 18b' and can only be removed by the satellite 18a'. The same applies for the buffer line 16b which can be operated by the satellites 18b'' and 18a''.

All other buffer lines 16 between the buffer lines 16a and 16b can be optionally supplied or emptied by the satellites 18. The satellites 18b', 18b'' can be understood as supply means and the satellites 18a', 18a'' as removal means. Further supply means and removal means are conceivable which are, however, not depicted here for the sake of clarity.

In the case shown in FIG. 6, the packaging system 2 operates without faults and the buffer table 6 does not have to temporarily store packages 14.

In the case of a fault in one of the packaging devices 8 between the transport belts 10b and 10c, the buffer table 6 must, however, be filled. In this case, a new package 14 cannot be fed out at the outfeed 6a'. These packages 14 could not be further processed since one of the packaging devices 8 operates with faults. As a result, the packages 14 arriving at the infeed 6b' are initially stored in the buffer line 16a. This can, e.g. be caused by a mechanical stop at the satellite 18a' which prevents the packages 14 being transported further.

If the buffer line 16a is filled up to a predetermined fill level with packages 14, the satellite 18b' is thus moved along the direction 22 to the next selected buffer line 16. The selection of which buffer line 16 is the next can be programmable. It is, in particular possible for only every x buffer line, in particular only every second, third or fourth buffer line 16 to be filled. This is depicted in FIG. 7 which shows the buffer table 6 according to FIG. 5 in operation.

After the buffer line 16a has been filled, the next buffer line 16 is initially filled with packages. The satellite 18W is then moved to the next buffer line 16 and packages 14 arrive, as depicted in FIG. 7, in this buffer line 16.

It can be recognised that the packages 14 arriving at the infeed 6W on the transport belt 10a are moved via the transport belt 24 to the satellite 18b'. During the times, at which the satellite 18W is moved along the direction 22 and is not directly assigned to a buffer line 16, the satellite 18b can prevent further transport of packages 14, for example to the outlet thereof by a mechanical stop or by clamping a package 14.

Figure 7:
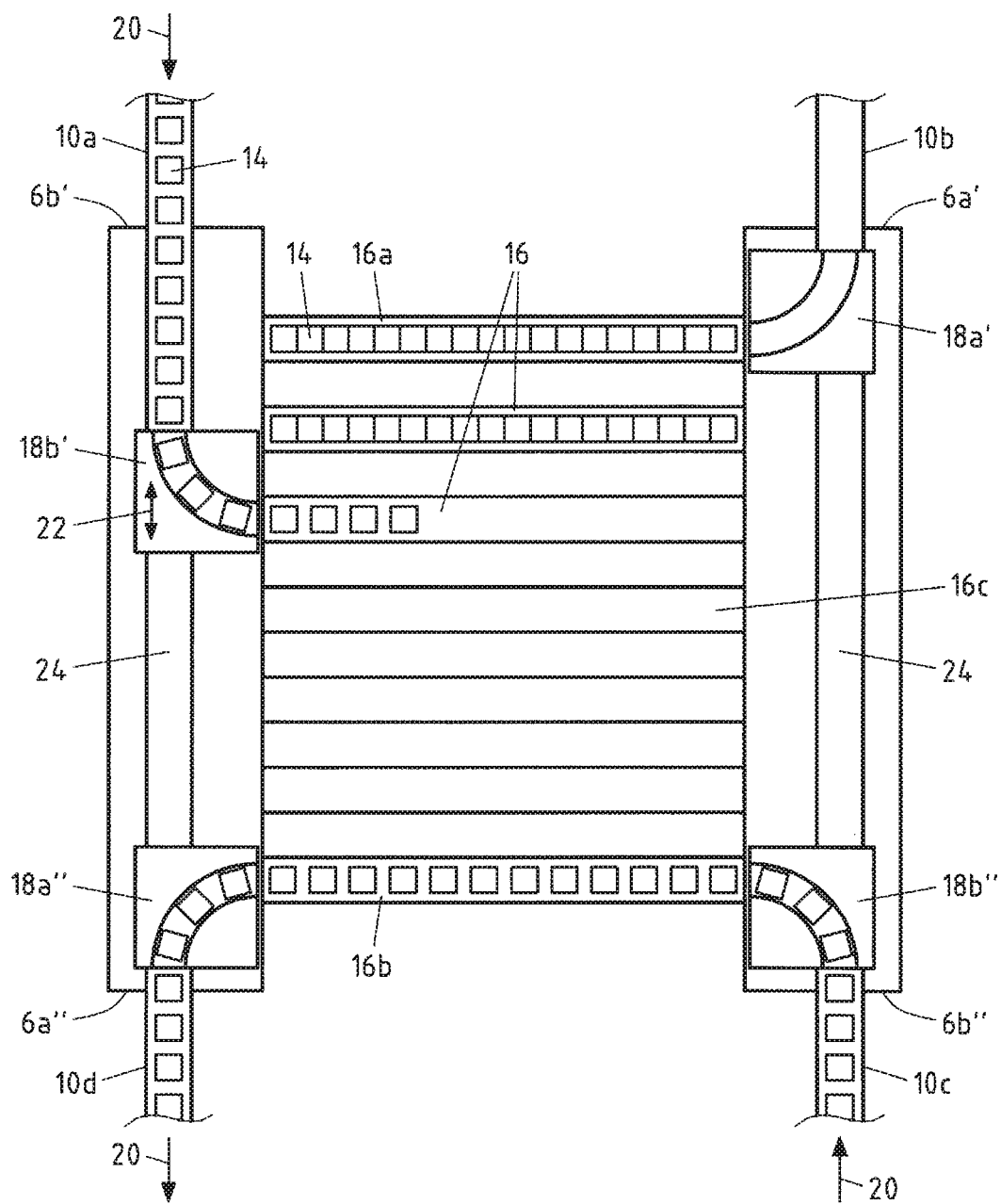
FIG. 7 a buffer table according to FIG. 5 in a first fault situation.

While the packages 14 arriving at the inlet 6b' are temporarily stored on the buffer table 6, the packages 14 still present on the transport belt 10c can arrive at the outfeed 6a'' or the transport belt 10d via the buffer line 16b, as is depicted in FIG. 7. The outlet of the packages 14 present between the packaging device 8 and the infeed 6b'' can hereby be ensured. The transport belt 10c thus runs empty if the packaging device 8 operates with faults.

The satellite 10b' can be moved up to a previously defined buffer line 16 along the direction 22. The position, up to which buffer line 16c the satellite 18b' is moved, can be calculated. The position of the buffer line 16c can, for example be calculated such that the ratio of the number of buffer lines between the buffer line 16a and the buffer line 16c as well as between the buffer line 16b and the buffer line 16c is dependent on the ratio of the fault frequencies of the processing device 8 to the fault frequencies of the processing device 12.

It is also possible for the satellites 18b', 18b'' to fill the buffer lines 16 until a buffer line 16 is reached which is already filled with packages 14 at a different level of completion.

Figure 8:
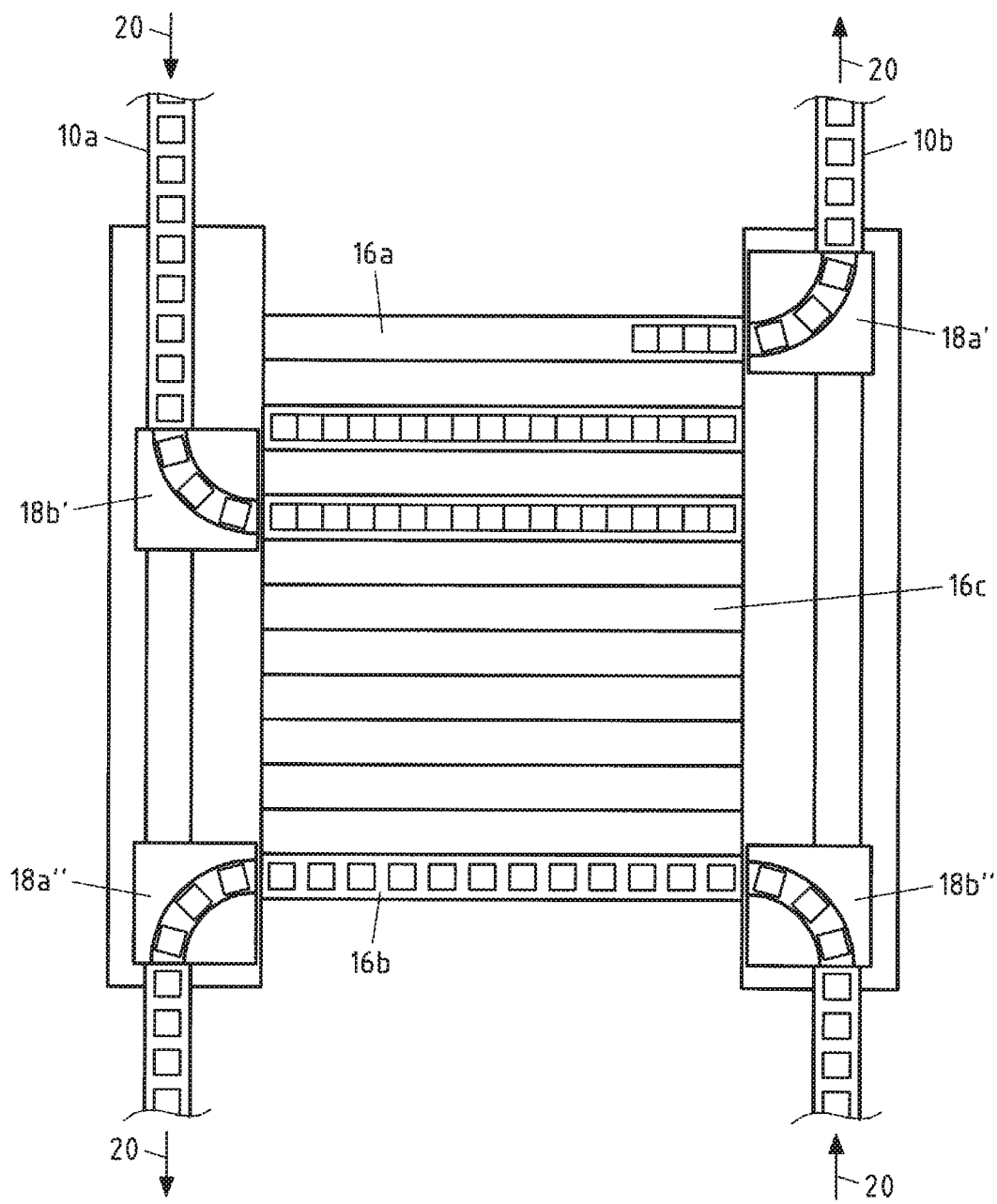
FIG. 8 a buffer table according to FIG. 7 shortly after ending the fault situation.

If the fault at the packaging device 8 is resolved, the buffer table 6 can thus run empty. This thus occurs by the satellite 18a' receiving the packages 14 from the first buffer line 16a and successively from all further filled buffer lines 16 and feeds them out via the outfeed 6a', as shown in FIG. 8. Until the first buffer line 16a is emptied, the satellite 18b' continues to fill the buffer lines 16 in the predefined sequence.

As soon as the buffer line 16a is emptied, the satellite 18b' returns to this buffer line 16a. At the same time, the further filled buffer lines 16 are served by the satellite 18a' and the packages 14 are removed from these buffer lines 16 and fed out from the buffer table 6. It is also possible for the satellite 18a' to initially fill the hitherto skipped buffer lines 16 on the return until it arrives at the last buffer line 16a. The satellite 18ar removes the packages 14 successively from the alternately filled buffer lines 16. As a result, the satellites 18a', 18b' only cover short paths when changing between two buffer lines when the buffer tables 6 run empty. A backlog on the transport belt 10a and the distances between packages 14 on the transport belt 10b are hereby kept small.

Since the processing rate on the outlet side of the buffer table 6 is greater than on the inlet side, the buffer lines 16 are emptied faster by the satellite 18a' than the latter are filled by the satellite 18b' such that after a certain time, the buffer lines 16 are emptied and the state corresponding to FIG. 6 is reached.

Figure 9:
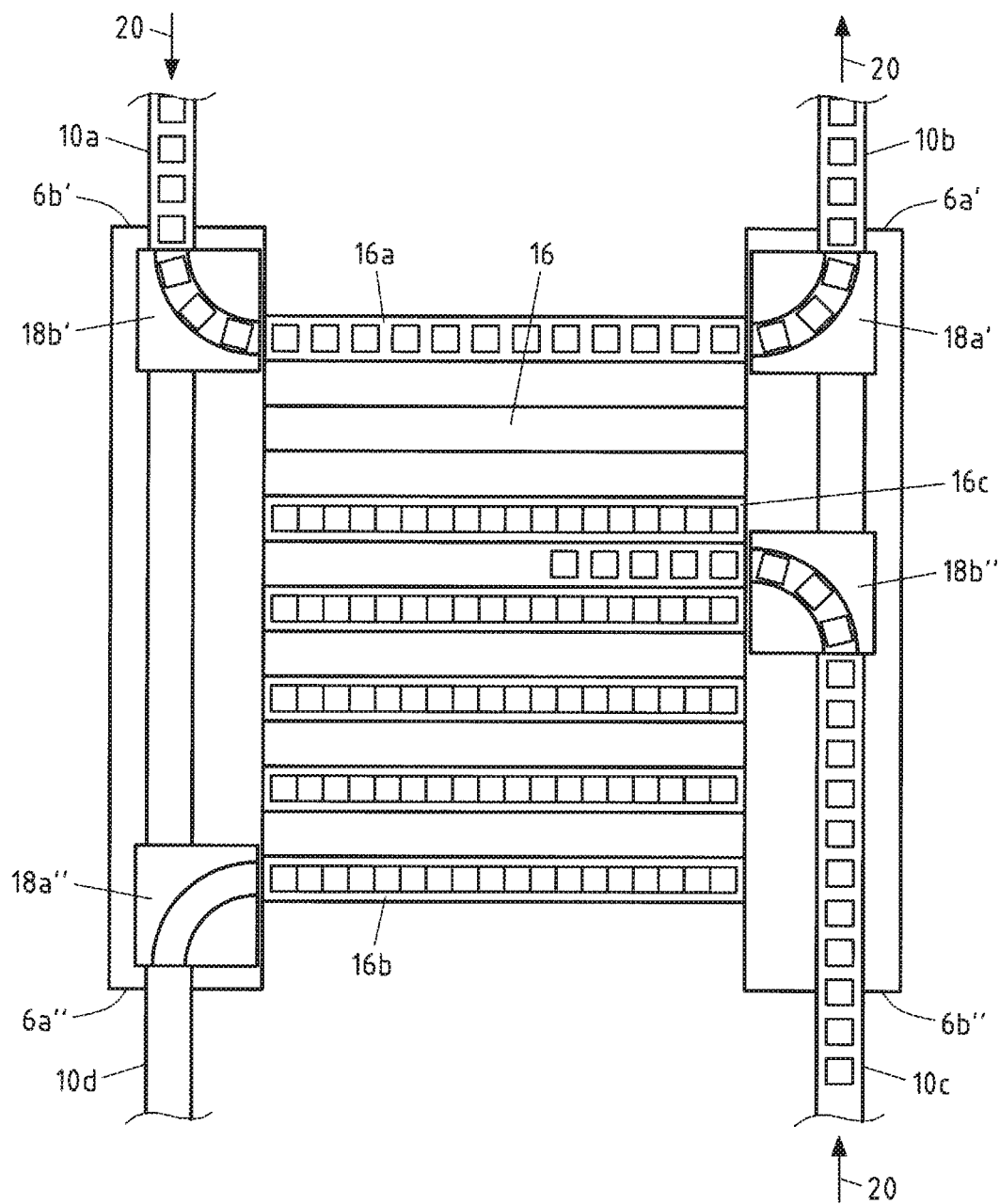
FIG. 9 a buffer table according to FIG. 5 in a second fault situation.

The same of course also takes place in the case of a fault on the outlet side of the outfeed 6a'', as shown in FIG. 9, which shows the buffer table 6 according to FIG. 5 in operation. In order to prevent the packaging device 8 and the packaging device 14 having to be immediately stopped, the buffer table 6 is, in this regard, initially filled in further buffer lines 16 proceeding from the buffer line 16b. The satellite 18lo'' serves, in this regard, successive respectively alternating buffer lines 16 until the buffer line 16c is reached. The position of the buffer line 16c can, as previously described, be dependent on the ratio of the fault probabilities of the packaging device 8 to the fault probabilities of the packaging device 12.

As soon as the buffer line 16c is reached, the satellite 18b' leaves the previously skipped buffer lines 16 in the opposing direction and fills these successively with packages 14 until either the buffer table 6 or the buffer lines between the buffer line 16c and the buffer line 16b are completely filled or the fault of the packaging device 12 is resolved. In the first case, at least the packaging devices 8 and 14, which border the buffer table 6, are then also stopped.

Figure 10:
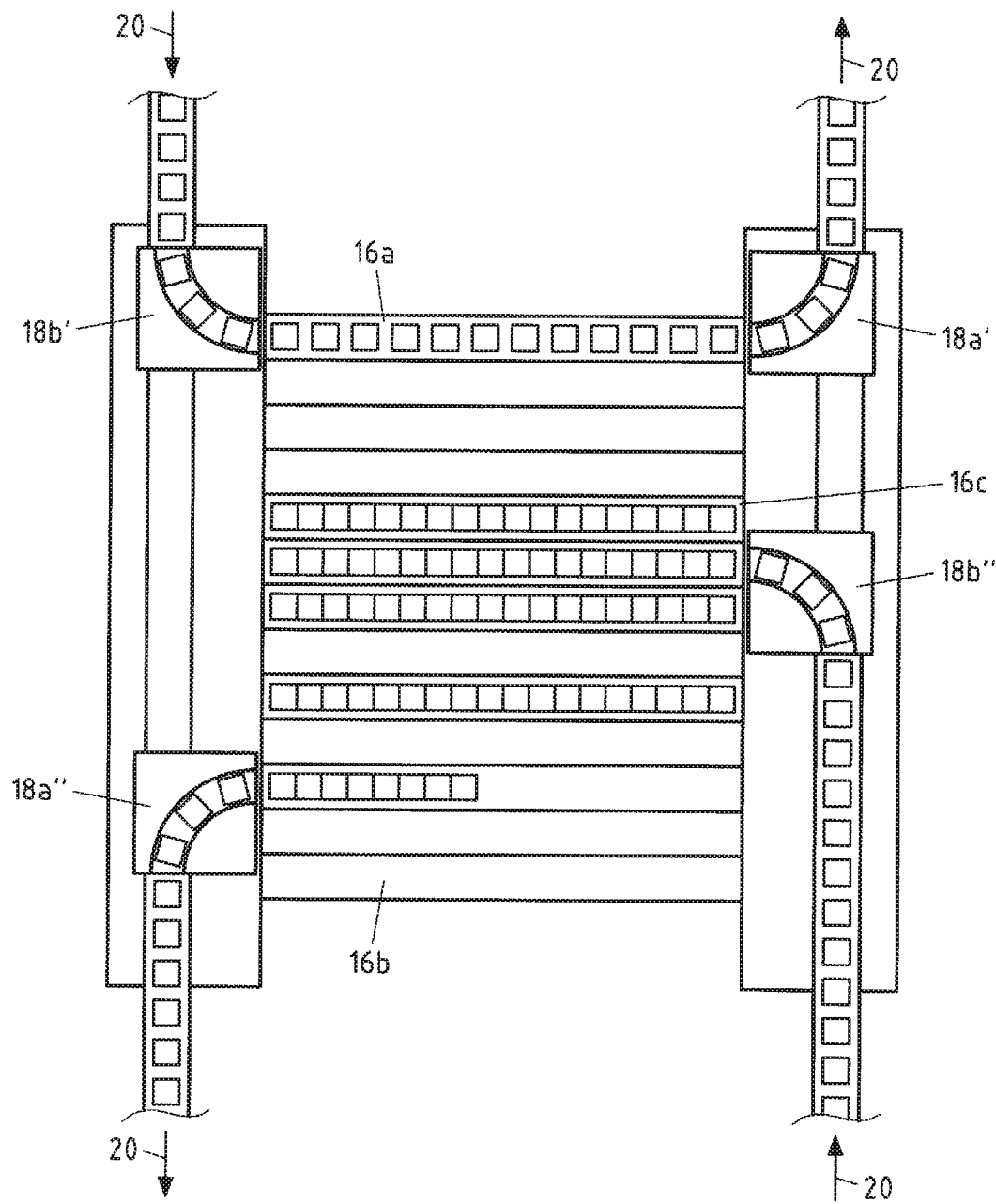
FIG. 10 a buffer table according to FIG. 9 shortly after ending the fault situation.

If the fault is, however, resolved in good time, then emptying of the buffer table 6 by the satellite 18a″ takes place, proceeding from the buffer line 16b, as FIG. 10 shows. The satellite 18a″, in this context, travels the same pattern as the satellite 18b″, that's to say, the buffer lines 16 are alternately started, up to the buffer line 16c and back. The satellite 16b″, in this regard, travels back up to the buffer line 16b such that after the buffer lines 16 between the buffer line 16h and the buffer line 16c have been emptied, the state corresponding to FIG. 6 is again established.

Figure 11:
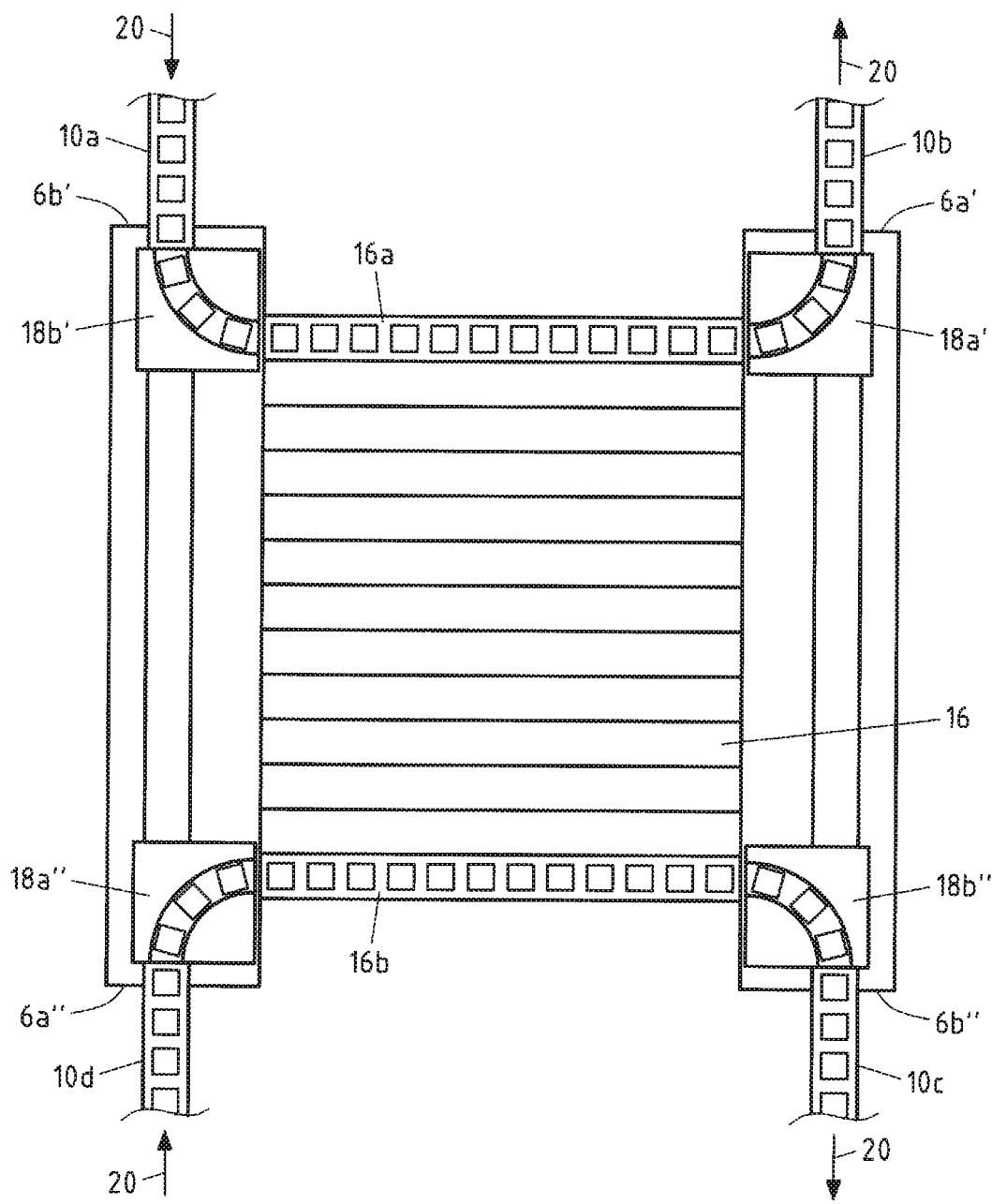
FIG. 11 a second buffer table according to an exemplary embodiment.

FIG. 11 shows a further exemplary embodiment, in the case of which two infeeds 6a′, 6a″ or two outfeeds 6b′, 6b″ are arranged on respectively one side of the buffer table 6. The flow direction of the packages 14 along the buffer table 6 is indicated by the arrows 20.

Figure 12:
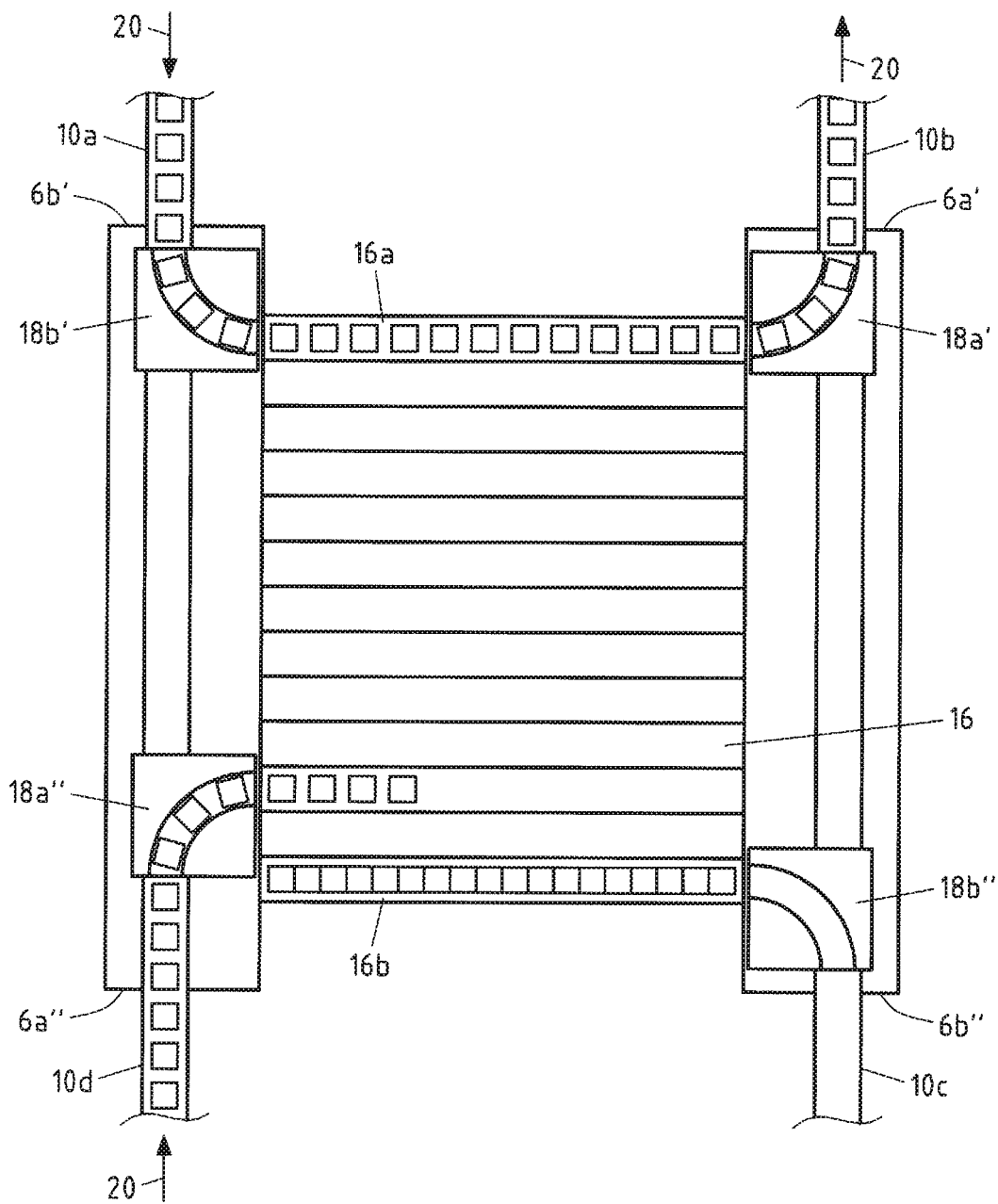
FIG. 12 a buffer table according to FIG. 11 in a first fault situation.

In the case of a fault, for example on the outlet side of the outfeed 6b″, filling of the buffer table 6 takes place as depicted in FIG. 12. This corresponds precisely to the pattern, as previously described, with the only difference being that the supply takes place on one side of the buffer table 6 and the removal on the other side of the buffer table 6. The transport direction of the package 14 on the buffer table 6 is thus always in the same direction since the packages 14 are always transported from the infeeds 6b′, 6b″ to the outfeeds 6a′, 6a″.

Figure 13:
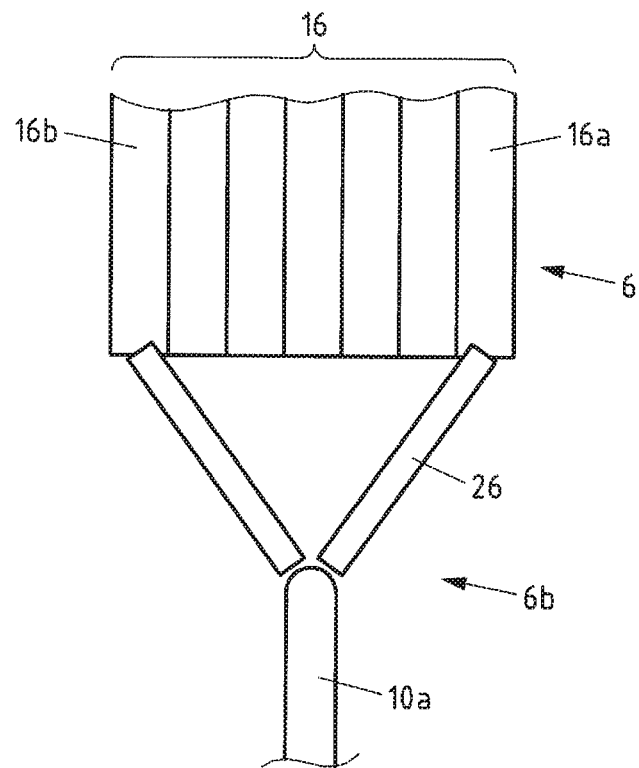
FIG. 13 an supply means according to one exemplary embodiment.

The supply means and the removal mean, as previously described by means of the satellites 18, can also be implemented by a pivotable transport belt 26, as depicted in FIG. 13. A pivotable transport belt 26 can be provided here at an infeed 6b which can be optionally pivoted between the buffer lines 16a and 16b of the buffer table 6, wherein each individual buffer line 16 between the buffer lines 16a and 16b can be approached. The packages 14 can thus be distributed on the buffer lines 16 of the buffer table 6 by pivoting the transport belt 26.

Figure 14:
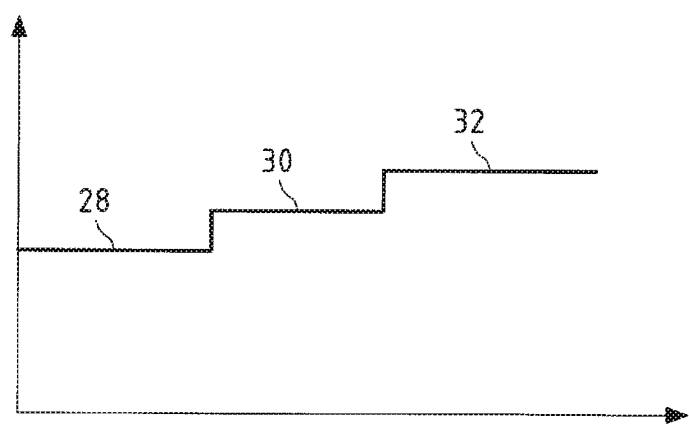
FIG. 14 different processing rates of different packaging devices according to one exemplary embodiment.

As previously explained, it is expedient for the respective packaging device 4, 8, 12 to operate downstream respectively with an increased processing rate with respect to the previous packaging device. This is schematically depicted in FIG. 14. The processing rates 28, 30, 32 of the packaging device 4, 8, 12 are plotted in FIG. 14. The processing rate 30 of the packaging device 8 is increased by 20% with respect to the processing rate 28 of the packaging device 4. The processing rate 32 of the packaging device 12 is also increased by 20% with respect to the processing rate 30 of the packaging device 8. The measure of the increase is freely selectable, however, it's preferably between 15 and 25%, in particular 20%.

Only a horizontal buffer table 6 is depicted for the sake of clarity. Whether the buffer lines 16 of the buffer table 6 can, however, only carry out horizontal movements of the packages 14, or are formed as a vertical buffer table, is irrelevant for the subject matter. The subject matter can, in fact, apply both to horizontal and to vertical buffer tables.

By means of the specific buffer table 6, it is possible to reduce the probability failure of a packaging system 2 while optimising the space requirement.

LIST OF REFERENCE NUMERALS

2 Packaging system
4 Filling machine
4a Outfeed
6 Buffer table
6a′, 6a″ Outfeed
6b′, 6b″ Infeed
8 Straw applicator
8a′, 8a″ Outfeed
8b′, 8b″ Infeed
10a-d Transport belt
12 Packaging device
12b Infeed
14 Package
14a Straw
16 Buffer lines
18 Satellite
20 Flow direction
22 Direction
22 Transport belt
24 Transport belt
28-32 Processing rate

The invention claimed is:

1. A buffer table of a packaging system comprising,
at least two infeeds which are configured to provide packages from respectively different packaging devices to the buffer table,
at least two outfeeds which are configured to retrieve packages from the buffer table and to provide the retrieved packages to downstream packaging devices, and
a plurality of buffer lines that can be supplied separately from each other, arranged between the infeed and the outfeed,
wherein
the infeeds are configured to supply the respective package to one of the buffer lines depending on the level of completion of the package, and
the outfeeds are configured to remove the respective package from the respective buffer lines depending on the level of completion of the package.

2. The buffer table of claim 1,
wherein
a transport means is arranged at each infeed and in that a transport means is arranged at each outfeed.

3. The buffer table of claim 1,
wherein
one outfeed is respectively assigned to one infeed, wherein the level of completion of the packages are respectively identical at the infeeds and outfeeds assigned to each other.

4. The buffer table of claim 1,
wherein
at least one infeed and one outfeed are respectively arranged at respectively one of two distal ends of the buffer lines.

5. The buffer table of claim 2,
wherein
the levels of completion are different from each other at at least two of the infeeds and/or in that the infeed is arranged to receive from the transport means supply packages at different levels of completion, respectively and/or in that the outfeeds are configured to provide the transport means with packages at different levels of completion, respectively.

6. The buffer table of claim 1,
wherein
the infeeds respectively comprise at least one supply means and/or in that the supply means of the respective infeeds are operated separately from each other.

7. The buffer table of claim 6,
wherein
the supply means are configured to transport the packages at the infeed between respective transport means and one of the buffer lines.

8. The buffer table of claim 6,
wherein
the supply means are arranged to provide respective packages with the same level of completion to a respective buffer line.

9. The buffer table of claim 1,
wherein
the outfeeds respectively comprise at least one removal means and/or in that the removal means of the respective outfeeds are operated separately from each other.

10. The buffer table of claim 9,
wherein
the removal means are configured to transport the packages at the outfeed between one of the buffer lines and respective transport means.

11. The buffer table of claim 9,
wherein
the removal means are configured to remove packages with the same level of completion from respectively one buffer line.

12. The buffer table of claim 9,
wherein
the removal means and/or supply means are formed as linearly operated satellites which are moved transverse to the buffer lines.

13. The buffer table of claim 9,
wherein
the removal means and/or supply means are formed as pivotably operated belts which pivot between the buffer lines proceeding from a respective transport belt.

14. The buffer table of claim 1,
wherein
the buffer lines comprise transport means, with which the packages are transportable between removal means and supply means, wherein the transport means comprise transport belts or transport bands.

15. The buffer table of claim 1,
wherein
the buffer lines are supplied, as required, by at least two of supply means respectively, such that one buffer line initially receives packages in temporal sequence at a first level of completion from a first supply means and subsequently receives packages at a second level of completion, different to the first, from a second supply means.

16. The buffer table of claim 6,
wherein
at least two of the buffer lines are respectively simultaneously supplied by at least two of the supply means.

17. The buffer table of claim 6,
wherein
at least two buffer lines are configured to simultaneously receive packages at two levels of completion, different from each other, from respectively one of the supply means.

18. The buffer table of claim 1,
wherein
a plurality of buffer lines are arranged adjacent to each other.

19. The buffer table of claim 1,
wherein
at least two supply means are arranged at the buffer lines and in that the supply means are respectively assigned exclusively to one of two, preferably distal, buffer lines.

20. The buffer table of claim 1,
wherein
the supply means are configured to respectively supply the buffer lines adjacent to each other one after the other starting from a peripheral buffer line.

21. The buffer table of claim 6,
wherein
the supply means are configured to supply one of the next buffer lines after reaching a defined fill level of one of the buffer lines.

22. The buffer table of claim 6,
wherein
the supply means are configured to alternately supply the buffer lines, wherein at least one unsupplied buffer line is respectively provided between two supplied buffer lines.

23. The buffer table of claim 1,
wherein
the buffer lines form a vertical buffer table or in that the buffer lines form a horizontal buffer table.

24. A packaging system comprising the buffer table of claim 1 and further comprising:
a first packaging device,
at least one second packaging device, and
at least one third packaging device, wherein:
the first packaging device is configured to supply packages at a first level of completion to a first transport means,
a first infeed is configured to supply the packages from the first transport means to at least one first buffer line of the buffer table,
a first outfeed is configured to remove the packages at the first level of completion from the at least one first buffer line and to supply them to a second transport means,
the at least one second packaging device is configured to receive the packages from the second transport means, to change the level of completion of the packages into a second level of completion and to supply them to a third transport means,
a second infeed is configured to supply the packages from the third transport means to at least one buffer line of the buffer table different to the first buffer line,
a second outfeed is configured to remove the packages at the second level of completion from the at least one second buffer line and supply them to a fourth transport means and
the third packaging device is configured to receive the packages from the fourth transport means.

25. The packaging system of claim 24,
wherein
a processing rate of the third packaging device is higher than a processing rate of at least one of the second packaging devices and/or in that a processing rate of at least the second packaging device is higher than a processing rate of the first packaging device.

26. A method for operating a buffer table comprising:
at least two infeeds,
at least two outfeeds, and
a plurality of buffer lines which are arranged between at least two infeeds and at least two outfeeds are supplied with packages separately from each other, wherein the method comprising:

supplying a respective package to one of the buffer lines depending on a level of completion of a package, and removing the respective package from the respective buffer lines depending on the level of completion of the package wherein the buffer table is supplied with packages having different levels of completion retrieved from different packaging devices of a packaging system.

* * * * *